(12) United States Patent
Makino et al.

(10) Patent No.: US 10,153,070 B2
(45) Date of Patent: Dec. 11, 2018

(54) WATERPROOF STRUCTURE OF WIRE HARNESS

(71) Applicants: YAZAKI CORPORATION, Tokyo (JP); TOYOTA JIDOSHA KABUSHIKI KAISHA, Toyota-shi, Aichi-ken (JP)

(72) Inventors: Kimitoshi Makino, Makinohara (JP); Tetsuro Saimoto, Makinohara (JP); Akihito Shibuya, Makinohara (JP); Masaaki Sugiyama, Toyota (JP); Masataka Yamamoto, Makinohara (JP); Kenji Kinezuka, Kakegawa (JP); Shinya Matsurra, Kakegawa (JP); Yasuhiro Suzuki, Kakegawa (JP); Takafumi Mori, Makinohara (JP); Takenori Tsuchiya, Toyota (JP)

(73) Assignees: YAZAKI CORPORATION, Minato-ku, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/629,995

(22) Filed: Jun. 22, 2017

(65) Prior Publication Data
US 2017/0372817 A1 Dec. 28, 2017

(30) Foreign Application Priority Data
Jun. 23, 2016 (JP) .................................. 2016-124871

(51) Int. Cl.
*H01B 7/282* (2006.01)
*H01B 7/00* (2006.01)
(Continued)

(52) U.S. Cl.
CPC .......... *H01B 7/2825* (2013.01); *H01B 7/0045* (2013.01); *H01B 13/01209* (2013.01); *B29C 45/00* (2013.01)

(58) Field of Classification Search
USPC ............................. 174/72 A; 439/44 A, 587
See application file for complete search history.

(56) References Cited

U.S. PATENT DOCUMENTS 3,317,658 A * 5/1967 Smith .................... H02G 15/18
174/138 F
4,335,932 A * 6/1982 Herrmann, Jr. ...... B29C 33/0016
174/541

(Continued)

FOREIGN PATENT DOCUMENTS

| CN | 103119662 A | 5/2013 |
|---|---|---|
| JP | 5-11483 U | 2/1993 |

(Continued)

OTHER PUBLICATIONS

Office Action dated Jul. 3, 2018 by the Japanese Patent Office in counterpart Japanese Patent Application No. 2016-124871.

(Continued)

*Primary Examiner* — Timothy Thompson
*Assistant Examiner* — Krystal Robinson
(74) *Attorney, Agent, or Firm* — Sughrue Mion, PLLC

(57) ABSTRACT

A waterproof structure of a wire harness includes at least one bundle of an electric wire group in which a plurality of electric wires are linearly arranged, a damming part made of a hard resin material, the damming part which surrounds a part of the electric wire group in an extension direction of the electric wire group and which includes an outer periphery shape part according to a shape of a trapezoidal through hole in an electric wire group insertion part with a divided structure, and a water stop material which prevents water from entering a gap between the electric wire group inser- (Continued)

tion part and the outer periphery shape part and which is formed on an inner peripheral surface of the through hole.

3 Claims, 8 Drawing Sheets

(51) Int. Cl.
*H01B 13/012* (2006.01)
*B29C 45/00* (2006.01)

(56) References Cited

U.S. PATENT DOCUMENTS

| | | | | |
|---|---|---|---|---|
| 4,563,051 A * | 1/1986 | Slachetka | ............ | H01R 12/596 439/585 |
| 4,601,530 A * | 7/1986 | Coldren | ................ | H01R 24/62 439/460 |
| 4,636,024 A * | 1/1987 | Yahata | ................ | H01R 13/595 439/449 |
| 4,662,692 A * | 5/1987 | Uken | ................ | H01R 13/5216 439/271 |
| 4,767,355 A * | 8/1988 | Phillipson | .......... | H01R 13/6599 439/425 |
| 4,800,648 A * | 1/1989 | Nakayama | ............ | B60J 5/0413 174/72 A |
| 4,978,316 A * | 12/1990 | Yahata | ................ | H01R 13/595 439/449 |
| 5,092,794 A * | 3/1992 | Kachlic | .............. | H01R 13/6582 439/607.41 |
| 5,264,814 A * | 11/1993 | Yamazaki | ................ | H01F 17/04 29/606 |
| 5,435,757 A * | 7/1995 | Fedder | ................... | H01R 13/11 439/686 |
| 5,460,530 A * | 10/1995 | Toba | ................... | B60R 16/0207 174/72 A |
| 5,529,508 A * | 6/1996 | Chiotis | .............. | H01R 13/5216 439/204 |
| 6,155,867 A * | 12/2000 | Chou | .................... | H01R 13/73 439/320 |
| 6,364,692 B1 * | 4/2002 | Okayasu | ............ | H01R 13/5219 439/204 |
| 6,547,452 B1 * | 4/2003 | Chan | ................. | B29C 45/14065 385/134 |
| 6,758,694 B2 * | 7/2004 | Liu | ...................... | H01R 13/405 439/606 |
| 7,641,500 B2 * | 1/2010 | Stoner | ................... | H01R 13/633 439/357 |
| 8,215,988 B2 * | 7/2012 | Ooki | .................. | H01R 13/5208 439/599 |
| 8,836,590 B2 * | 9/2014 | Marten | ................. | H01Q 1/3275 343/711 |
| 9,843,139 B2 * | 12/2017 | Ohkubo | ................. | H01R 9/032 |
| 2002/0038716 A1 * | 4/2002 | Pineda | .................... | G02B 6/504 174/68.3 |
| 2002/0052141 A1 * | 5/2002 | Hattori | ............... | H01R 13/5205 439/587 |
| 2006/0025006 A1 * | 2/2006 | Powell | ............... | H01R 13/5812 439/449 |
| 2006/0032653 A1 * | 2/2006 | Minoshima | ........ | H01R 13/5216 174/564 |
| 2007/0037436 A1 * | 2/2007 | Iwahori | ............. | H01R 13/5205 439/422 |
| 2011/0256756 A1 * | 10/2011 | Lu | ........................ | H01B 7/0892 439/449 |
| 2012/0018196 A1 * | 1/2012 | Lin | ...................... | H05K 1/0253 174/254 |
| 2013/0126232 A1 | 5/2013 | Sakuma | | |
| 2013/0137285 A1 * | 5/2013 | Miura | .................... | H01R 12/81 439/271 |
| 2013/0330963 A1 * | 12/2013 | Miura | ................... | H01R 12/777 439/492 |
| 2015/0236442 A1 * | 8/2015 | Cho | ........................ | H01R 4/023 439/271 |
| 2016/0307670 A1 * | 10/2016 | Makino | ..................... | H02G 3/22 |

FOREIGN PATENT DOCUMENTS

| | | |
|---|---|---|
| JP | 2010-30384 A | 2/2010 |
| JP | 2010-260297 A | 11/2010 |
| JP | 2011-172412 A | 9/2011 |
| JP | 2012-30429 A | 2/2012 |
| JP | 2013-103492 A | 5/2013 |

OTHER PUBLICATIONS

Communication dated Sep. 3, 2018, issued by the China National Intellectual Property Administration in counterpart Chinese Application No. 201710488455.6.

* cited by examiner

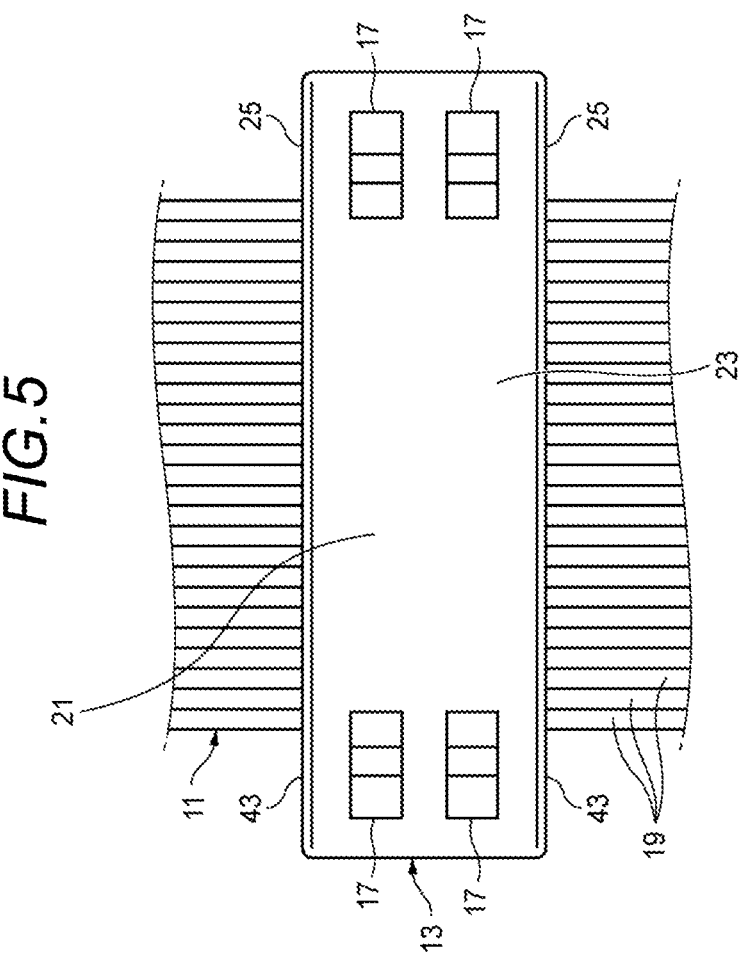

WATERPROOF STRUCTURE OF WIRE HARNESS

CROSS REFERENCE TO RELATED APPLICATIONS

This application claims priority from Japanese Patent Application No. 2016-124871 filed on Jun. 23, 2016, the entire contents of which are incorporated herein by reference.

BACKGROUND OF THE INVENTION

Field of the Invention

The present invention relates to a waterproof structure of a wire harness.

Description of Related Art

A water stop structure of a wire harness formed by bundling plural electric wires includes the water stop structure using a one-component water stop (silicon) or butyl rubber. In the water stop structure by the one-component water stop, as shown in FIG. 8A, an electric wire bundle is loosened into individual electric wires 501, and silicon 503 is applied, adapted, molded and solidified. An outer periphery of the solidified silicon 503 is covered with a sheet material 505. In the wire harness provided with the water stop structure in this manner, a grommet 507 is externally inserted to an outer periphery of the sheet material 505. The grommet 507 prevents water from entering a gap between the sheet material 505 and a harness insertion hole (not shown) of a vehicle body panel etc.

Also, in the water stop structure by the butyl rubber, as shown in FIG. 8B, an electric wire bundle is loosened into individual electric wires 501, and the electric wires 501 are put on butyl rubber 509, and laying of the butyl rubber 509 and the electric wires 501 is repeated and pressurized, and gaps between the electric wires 501 are filled with the butyl rubber 509, and the butyl rubber 509 is molded. An adhesive tape 511 is wound on an outer periphery of the butyl rubber 509. In the wire harness provided with the water stop structure in this manner, a seal sponge 513 is wound on an outer periphery of the adhesive tape 511. The seal sponge 513 prevents water from entering a gap between the adhesive tape 511 and a harness insertion hole (not shown).
[Patent Document 1] JP-A-2011-172412

According to a related art, in a water stop structure by a one-component water stop, a gap between electric wires is filled with a water stop agent (silicon 503) to adhere to an electric wire coating. As a result, water stop performance is very good, but it is difficult to manage the water stop agent and moreover, the time taken to solidify the water stop agent is about several hours, with the result that workability is not good. Also, in the water stop structure by a butyl rubber 509, a gap between the electric wires is filled with a water stop agent (butyl rubber 509), and the butyl rubber itself is soft and tends to adapt, but the butyl rubber has adhesion properties, with the result that water stop performance is good when the gap is surely filled with the water stop agent, but there is a problem difficult to manage the amount of the butyl rubber used. Further, in the water stop structure by the butyl rubber 509, workability is bad, for example, the butyl rubber 509 adheres to hands due to sticky properties, and also it is difficult to check a filling state.

Also, a known technique capable of application to the water stop structure is a mold structure in which an outer periphery of an electric wire bundle is molded of a resin material (see Patent Document 1 etc.). However, in such a mold structure, when three or more electric wires are bundled, a gap (resin unfilled space) incapable of being filled with the resin is formed between the adjacent electric wires.

Also, in the mold structure, molding is performed by a normal injection molding machine. As a result, equipment becomes large-scale.

Further, when a sealing resin part (called also a "damming part" in the present specification) of the mold structure is set in an electric wire group insertion part with a divided structure formed on upper and lower cases (partition wall parts), the damming part preferably has an outer periphery shape part with a trapezoidal shape in cross section according to the electric wire group insertion part formed in a tubular shape in which a trapezoidal through hole is defined. However, in the damming part having the outer periphery shape part with the trapezoidal shape in cross section, molding defects such as sinks or voids tend to occur due to the presence of a thick-walled part, and it becomes difficult to mold the resin. When the sinks etc. occur in the outer periphery shape part of the damming part, water tends to enter a gap between the damming part and the through hole, and waterproofness becomes insufficient.

SUMMARY

One or more embodiments provide a waterproof structure of a wire harness in which can improve a waterproof effect while using a damming part with a trapezoidal shape in cross section.

In an aspect (1), one or more embodiments provide a waterproof structure of a wire harness includes at least one bundle of an electric wire group in which a plurality of electric wires are linearly arranged, a damming part made of a hard resin material, the damming part which surrounds a part of the electric wire group in an extension direction of the electric wire group and which includes an outer periphery shape part according to a shape of a trapezoidal through hole in an electric wire group insertion part with a divided structure, and a water stop material which prevents water from entering a gap between the electric wire group insertion part and the outer periphery shape part and which is formed on an inner peripheral surface of the through hole. A pair of first portions located in vicinities of a pair of opposing edge parts in the extension direction of the electric wire group in the outer periphery shape part respectively have trapezoidal shapes in cross sections. A second portion has a lightening part.

According to the aspect (1), the damming part set in the electric wire group insertion part with a divided structure formed on, for example, upper and lower cases prevents water from entering a gap between the damming part and the through hole of the electric wire group insertion part by the outer periphery shape part of parts of the vicinities of the pair of edge parts formed in the trapezoidal shape in cross sections. In the damming part, the outer periphery shape part of a different portion is formed with the lightening part to decrease the volume of a thick-walled part and thereby, molding defects such as sinks or voids in the case of molding the electric wire group become resistant to occurring.

In an aspect (2), the second portion in the outer periphery shape part further have a portion including a trapezoidal shape in a cross section.

According to the aspect (2), a different portion in the outer periphery shape part of the damming part is also formed with a portion having a trapezoidal shape in cross section and thereby, a gap between the damming part and the through hole can be sealed watertightly in multiple steps in a passage direction of water. Accordingly, the damming part can further prevent the water from entering the gap between the damming part and the through hole of the electric wire group insertion part.

In an aspect (3), a length of the water stop material in an axial direction of the through hole is longer than a length of the outer periphery shape part in the extension direction of the electric wire group.

According to the aspect (3), the length of the water stop material is set longer than the length of the outer periphery shape part along the extension direction of the electric wire group and thereby, the pair of edge parts of the outer periphery shape part is not separated from the water stop material even when a position of the damming part deviates from the through hole of the electric wire group insertion part. Accordingly, the damming part can stably prevent the water from entering the gap between the damming part and the through hole.

The waterproof structure of the wire harness according to the invention can improve a waterproof effect while using the damming part with the trapezoidal shape in cross section.

The invention has been briefly described above. Further, the details of the invention will become more apparent by reading through a mode (hereinafter called an "embodiment") for carrying out the invention described below with reference to the accompanying drawings.

BRIEF DESCRIPTION OF THE DRAWINGS

FIG. 5 is a bottom view of the damming part shown in FIG. 1.

DETAILED DESCRIPTION

An embodiment according to the invention will hereinafter be described with reference to the drawings.

Figure 1:
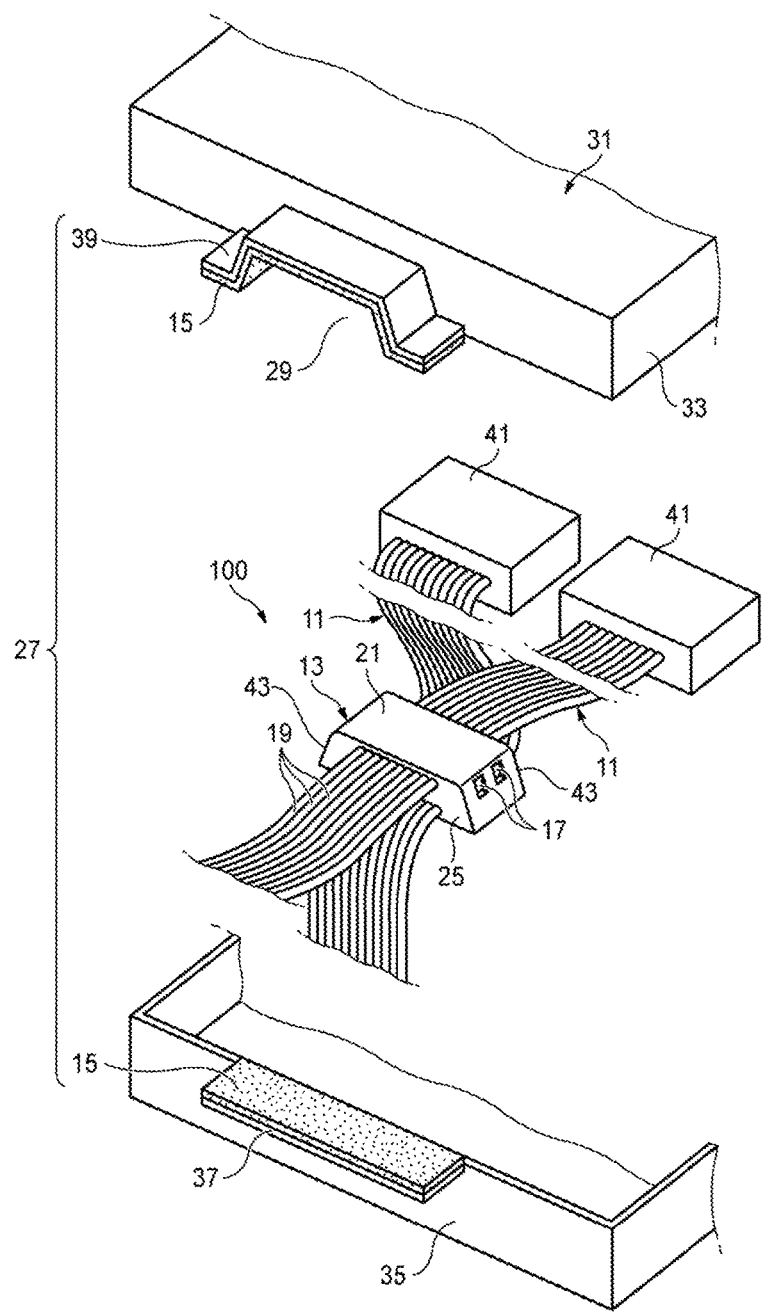
FIG. 1 is a main exploded perspective view of a device connecting structure using a wire harness including a waterproof structure of the wire harness according to one embodiment of the invention.

FIG. 1 is a main exploded perspective view of a device connecting structure using a wire harness 100 including a waterproof structure of the wire harness according to one embodiment of the invention.

The wire harness 100 including the waterproof structure of the wire harness according to the present embodiment has an electric wire group 11 made of plural electric wires 19 arranged in a horizontal direction, a damming part 13 made of a hard resin material, a water stop material 15, and lightening parts 17.

In addition, in the embodiment, waterproofness refers to water stop performance more than or equal to drip-proof performance.

In the electric wire group 11, the plural electric wires 19 are linearly arranged in at least one bundle. An outer periphery of a conductor of each of the electric wires 19 is covered with an insulating resin. The "at least one bundle" means that plural bundles may be arranged in multiple steps. However, in this case, the electric wire groups of each of the steps are mutually spaced.

The plural electric wire groups 11 are spaced in plural steps in a direction intersecting with an arrangement direction of the electric wires 19 in the damming part 13. In the embodiment, the electric wire groups 11 are arranged in two steps.

Figure 2:
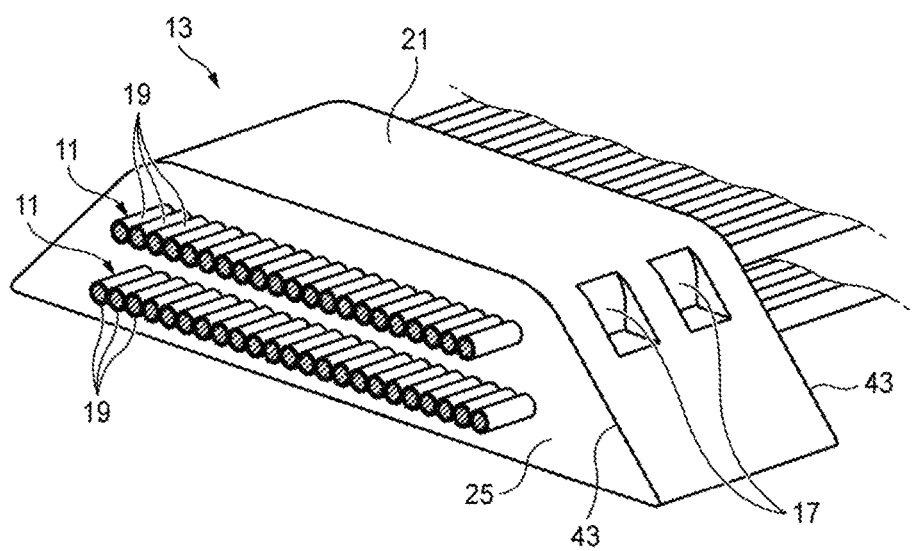
FIG. 2 is an enlarged view of a damming part shown in FIG. 1.

As shown in FIG. 2, the damming part 13 is integrally molded so as to surround a part of the electric wire group 11 of each step in an extension direction of the electric wire group 11. This damming part 13 is integrally molded so as to have an outer periphery shape part 21 according to a trapezoidal through hole 29 in an electric wire group insertion part 27 described below.

A low-pressure injection molding machine described below is used for molding the damming part 13. In the low-pressure injection molding machine, the hard resin material, for example, a general engineering plastic (engineering plastic) is used. In other words, the wire harness 100 including the waterproof structure of the wire harness according to the invention is configured to bury (insert-mold) a part of the electric wire group 11 in the extension direction in this engineering plastic.

The adjacent mutual electric wires 19 of each bundle may be slightly spaced or make contact. This is because when the electric wires 19 are slightly spaced, a resin enters a gap between the electric wires 19 and the outer peripheries of the electric wires 19 are surrounded to make the electric wires 19 waterproof and when the electric wires 19 make contact, its contact can make the electric wires 19 waterproof.

Also, in the wire harness 100, the plural electric wires 19 are linearly arranged in one bundle in the electric wire group 11, with the result that resin unfilled space surrounded by three or more electric wires 19 is not formed, and water can surely be prevented from entering the gaps between the adjacent mutual electric wires.

Figure 3A:
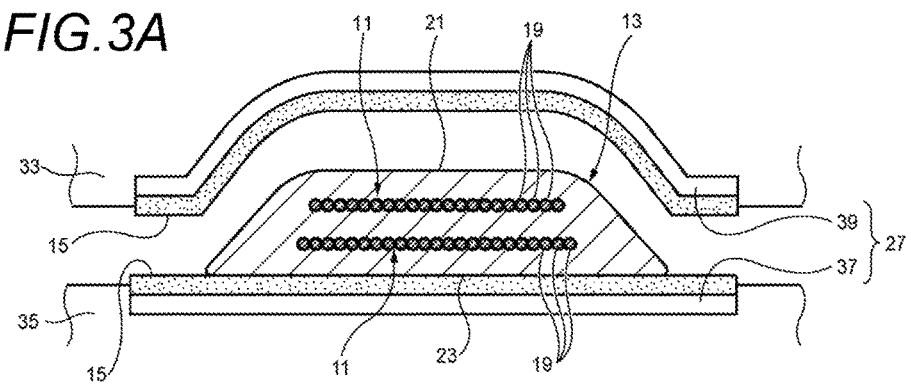
FIG. 3A is a front view of the damming part set in an electric wire group insertion part.
Figure 3B:
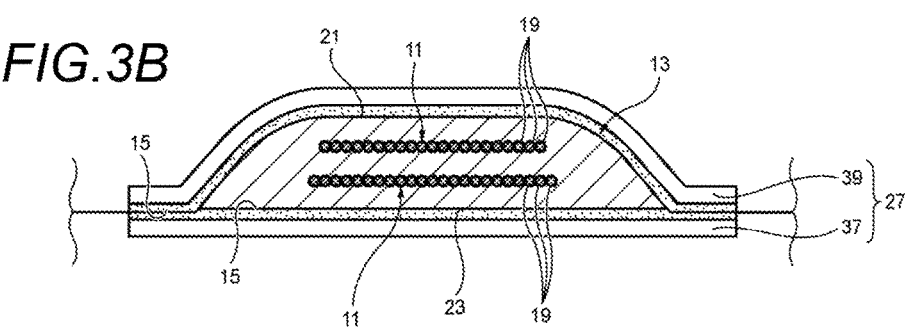
FIG. 3B is a front view of the damming part inserted into a through hole of the electric wire group insertion part.

As shown in FIGS. 3A and 3B, the damming part 13 has the outer periphery shape part 21 with a trapezoidal shape in cross section cut by a plane orthogonal to the extension direction of the electric wire group 11. In the damming part 13, a surface of a base side with the trapezoidal shape in cross section forms a seating surface 23 (see FIG. 5). Also, in the damming part 13, a pair of opposing side surfaces pinching the seating surface 23 forms electric wire penetration side surfaces 25. The electric wire group 11 extends through the damming part 13 from one electric wire penetration side surface 25 toward the other electric wire penetration side surface 25.

The trapezoidal shape in cross section of the damming part 13 corresponds to the trapezoidal through hole 29 in the electric wire group insertion part 27 shown in FIG. 3B. The electric wire group insertion part 27 has a divided structure formed on an upper case (partition wall part) 33 and a lower case (partition wall part) 35 of a water stop box 31. And, the damming part 13 of the wire harness 100 is fitted into the electric wire group insertion part 27. That is, the wire harness 100 extends through the partition wall parts by the damming part 13 fitted into the electric wire group insertion part 27.

Figure 3C:
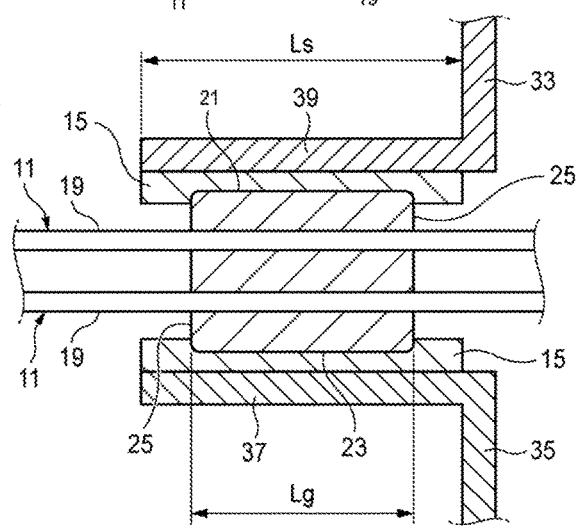
FIG. 3C is a longitudinal sectional view of the damming part inserted into the through hole of the electric wire group insertion part.

In the embodiment, as shown in FIG. 3A, a bottom plate part 37 formed on the lower case 35 is combined with a chevron-shaped flange part 39 formed on the upper case 33 to thereby form the electric wire group insertion part 27 in a tubular shape in which the trapezoidal through hole 29 is defined. In this case, after the seating surface 23 is placed on the bottom plate part 37, the damming part 13 is covered with the chevron-shaped flange part 39 and thereby, the damming part 13 is pinched by the bottom plate part 37 and the chevron-shaped flange part 39 to be fixed as shown in FIGS. 3B and 3C. This damming part 13 is pinched by fixing through a fastener (not shown) for fastening the divided upper case 33 and lower case 35, or by fixing through a fastener (not shown) for directly fastening the bottom plate part 37 and the chevron-shaped flange part 39.

The upper case 33 and the lower case 35 receive an electronic device (not shown). In the wire harness 100, for example, connectors 41 respectively formed on the two electric wire groups 11 are connected to the electronic device. In the water stop box 31, the damming part 13 is pinched by the electric wire group insertion part 27 and thereby, the damming part 13 makes the electric wire groups 11 waterproof with the electric wire groups 11 spaced in two upper and lower steps and overlapped.

In the damming part 13, the electric wire groups 11 are arranged in multiple steps as the number of the electric wire groups 11 connected is increased. Accordingly, the damming part 13 can collectively make the many electric wire groups 11 waterproof in the electric wire group insertion part 27 of the water stop box 31.

In the electric wire group insertion part 27, the water stop material 15 such as a seal sponge or rubber is stuck on an inner peripheral surface of the through hole 29. The water stop material 15 surely prevents water from entering a gap between the inner peripheral surface of the through hole 29 and the outer periphery shape part 21 of the damming part 13. In addition, the water stop material 15 can be stuck on the outer periphery shape part 21 of the damming part 13.

As shown in FIG. 3C, the water stop material 15 in the embodiment has a length Ls along an axial direction of the through hole 29. This length Ls is set longer than a length Lg of the outer periphery shape part 21 along the extension direction of the electric wire group 11.

Figure 6A:
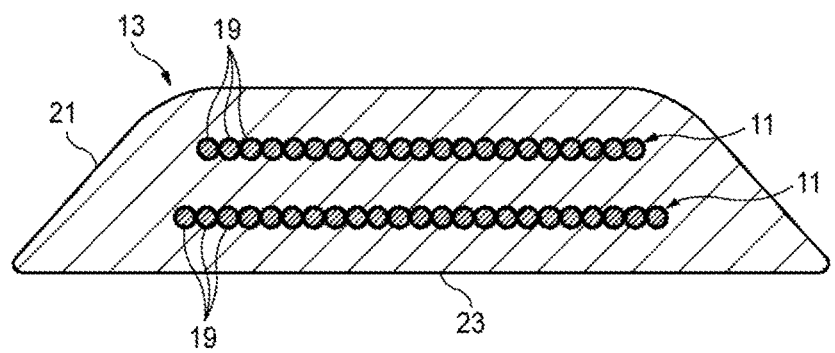
FIG. 6A is a sectional view taken on line A-A of FIG. 4.

In the damming part 13 of the embodiment, parts (edge part vicinity regions 45 shown in FIG. 4) of the vicinities of a pair of edge parts 43 along the extension direction of the electric wire group 11 in the outer periphery shape part 21 are respectively formed in trapezoidal shape in cross sections shown in FIG. 6A. The pair of edge parts 43 is corners of a trapezoidal body in which an annular surface (an annular outer peripheral surface pinched by a pair of electric wire penetration side surfaces 25) of the outer periphery shape part 21 respectively intersects with the pair of electric wire penetration side surfaces 25 through which the electric wire group 11 extends.

Figure 4:
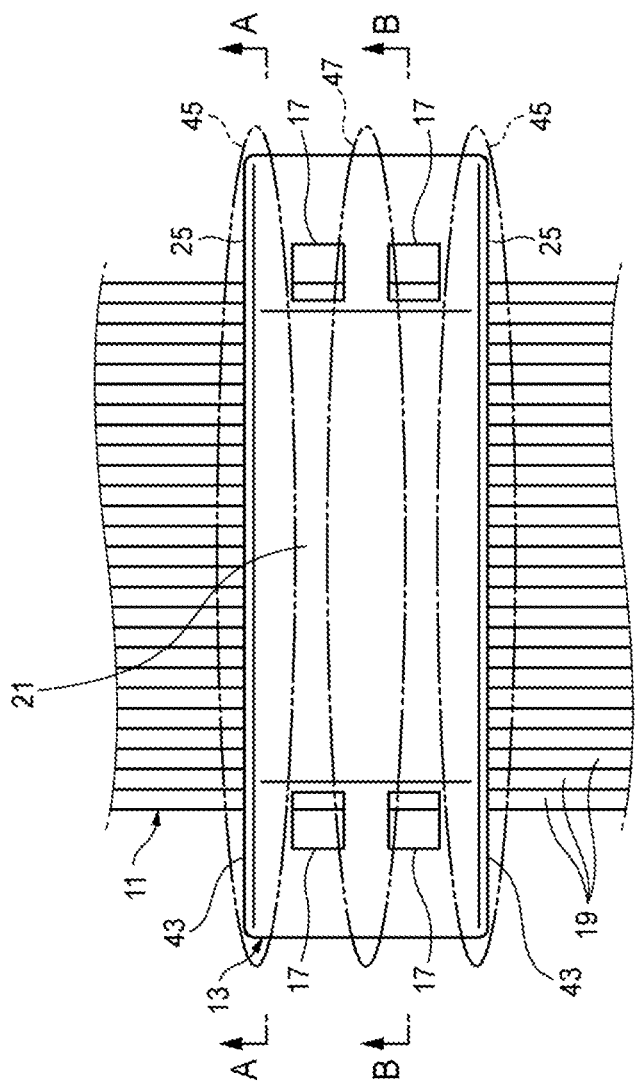
FIG. 4 is a plan view of the damming part shown in FIG. 1.
Figure 6B:
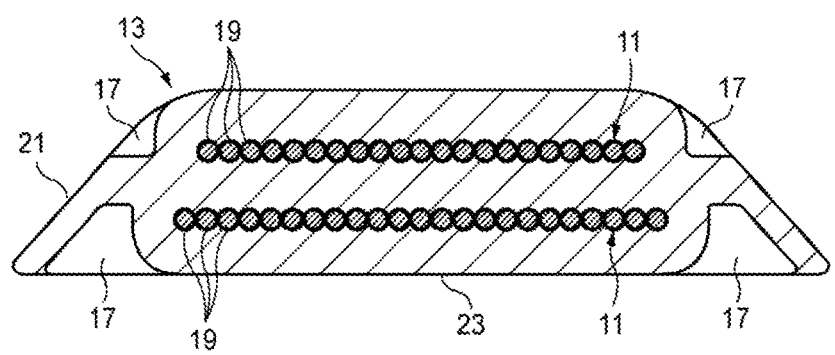
FIG. 6B is a sectional view taken on line B-B of FIG. 4.

The damming part 13 of the embodiment has the lightening parts 17 in portions other than the edge part vicinity regions 45 as shown in FIGS. 4, 5 and 6B. The lightening part 17 is formed by recessing a surface of the damming part 13 in wedge-shaped space. Consequently, in a molding tool 51 for molding the damming part 13 as described below, a wedge-shaped lightening molding part 87 for forming the lightening part 17 is projected toward a cavity 75 (see FIG. 7).

The lightening part 17 is formed in a thick-walled part of the damming part 13. The damming part 13 is molded by filling the cavity 75 of the molding tool 51 with a molten resin as described below. Since the molten resin has small heat conduction to the molding tool, it takes time to cool the molten resin in the thick-walled part. On the other hand, the time taken to cool the molten resin in a thin-walled part becomes shorter than the time taken to cool the molten resin in the thick-walled part. The molten resin is cured with a decrease in temperature, and is shrunk with curing. In the damming part with the trapezoidal shape in cross section, sinks such as depression of a surface of a molded product, or voids caused by producing a vacuum inside the molded product tend to occur in the thick-walled part due to internal stress by a difference between the cooling times.

In the damming part 13 of the embodiment, the thick-walled part is formed with the lightening part 17 in order to avoid the occurrence of the sinks etc. That is, in the lightening part 17, a surface of the thick-walled part in the damming part 13 is recessed to thereby decrease the volume of this thick-walled part. Particularly in the embodiment, the thick-walled part adjacent to a pair of edge parts 43 is provided with the lightening part 17. More concretely, the lightening parts 17 are formed in inclined surfaces of both sides of the damming part 13 in the arrangement direction of the electric wires 19 and the seating surface 23 opposite to the inclined surfaces. That is, the lightening parts 17 can be formed in a total of four places including one pair in the inclined surfaces of both sides and one pair in the seating surface 23 opposite to the inclined surfaces in the same cross-sectional position cut by the plane orthogonal to the extension direction of the electric wire group 11.

Also, like the damming part 13 of the embodiment, the lightening parts 17 in four places can be formed in plural pairs in the extension direction of the electric wire groups 11. In the embodiment, the lightening parts 17 are formed in a total of eight places including two sets in the extension direction of the electric wire groups 11.

In the embodiment, in the damming part 13, a part 47 between the lightening parts (see FIG. 4), which is a different portion of the outer periphery shape part 21, is further formed with a portion formed in a trapezoidal shape in cross section. In other words, the portion formed in the trapezoidal shape in cross section in the different portion is formed between two sets of the lightening parts 17 in the extension direction of the electric wire group 11. Thus, in the damming part 13, the portions formed in the trapezoidal shape in cross sections can be formed in plural places in a direction along the extension direction of the electric wire group 11.

In the damming part 13, sinks do not occur in a pair of edge parts 43 for characteristics of resin molding. As a result, in the damming part 13, the vicinity of these edge parts 43 is set in a place of formation of the portion formed in the trapezoidal shape in cross section, and the other place is set in a place of formation of the lightening part 17 in which the thick-walled part is formed in a proper wall thickness. The three or more portions with the trapezoidal shape in cross sections formed in the different portion of the outer periphery shape part 21 can also be formed according to arrangement of the lightening part 17 or the width of the damming part 13 in the extension direction of the electric wire group 11.

Figure 7:
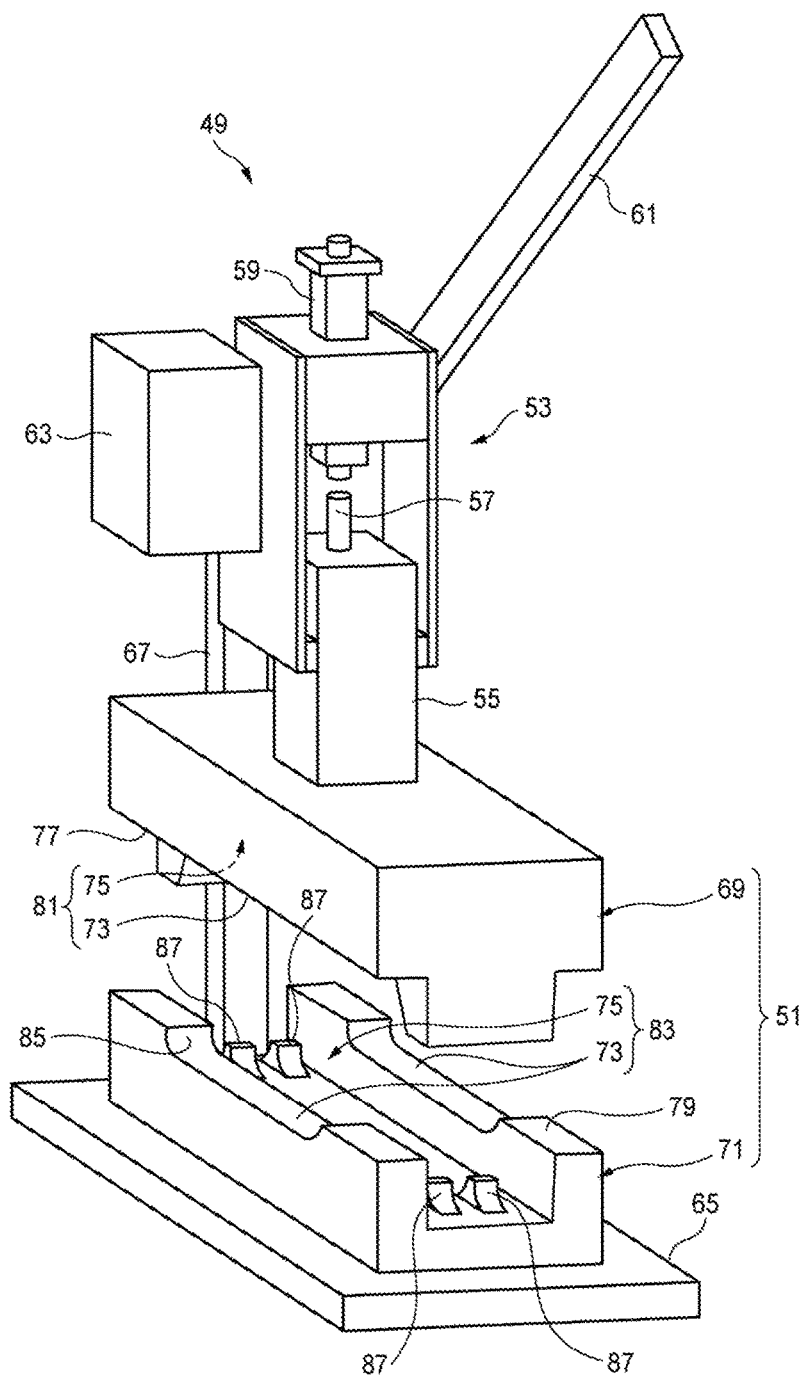
FIG. 7 is a perspective view of a low-pressure injection molding machine.
Figure 8A:
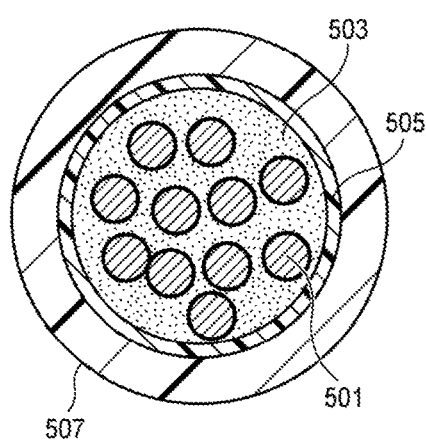
FIG. 8A is a transverse sectional view of a conventional water stop structure by a one-component water stop.
Figure 8B:
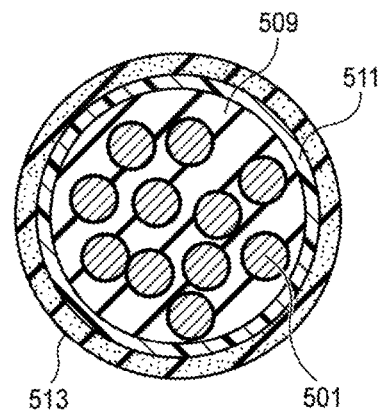
FIG. 8B is a transverse sectional view of a conventional water stop structure by butyl rubber.

FIG. 7 is a perspective view of a low-pressure injection molding machine.

In the embodiment, a low-pressure injection molding machine 49 is used for molding the damming part 13. The low-pressure injection molding machine 49 can mold a damming member integrally in a halfway position of the electric wire group 11. In addition, a normal injection molding machine may naturally be used in the waterproof structure of the wire harness according to the embodiment. The low-pressure injection molding machine 49 is a molding machine which even one operator can operate without external power of an electric motor etc. The low-pressure injection molding machine 49 includes the molding tool 51, a mold clamping device (not shown), and a low-pressure injection device 53 for pressurizing and injecting a molten resin into the molding tool 51.

The low-pressure injection device 53 has a heating tube 55 provided with a heater for heating and melting a synthetic resin etc., a plunger 57 for injecting the molten resin of the inside of the heating tube from a nozzle (not shown), an injection cylinder 59 for advancing the plunger 57, a handle 61 for driving the injection cylinder 59, and a temperature controller 63 for holding a heating temperature of the heating tube 55 at a desired temperature, and these members are supported in a device strut 67 erected on a pedestal 65.

In addition, the low-pressure injection molding machine 49 in the embodiment refers to a machine in which the maximum amount of resin moldable in one injection molding is about 10 g and operation can be performed manually using an air cylinder, a link, etc. at the time of clamping of the molding tool. Of course, the low-pressure injection device 53 may be a device for driving the injection cylinder 59 by external power of an electric motor, air, etc. More concretely, publicly known "injection molding machines" disclosed in, for example, JP-A-2010-260297, JP-A-2012-30429 and JP-A-2013-103492 can be used as the low-pressure injection molding machine 49.

The molding tool 51 according to the embodiment is arranged on the pedestal 65. In the molding tool 51, an upper mold 69 and a lower mold 71 pinch the electric wire group 11 by burr cutters 73 formed on both outside end portions along the extension direction of the electric wire group 11 to thereby define space (cavity 75) capable of molding the damming part 13.

That is, the upper mold 69 and the lower mold 71 have an upper mold division surface 77 and a lower mold division surface 79. The upper mold division surface 77 and the lower mold division surface 79 are provided with an upper side harness receiving part 81 and a lower side harness receiving part 83. When the upper mold 69 and the lower mold 71 are clamped, the molding tool 51 defines the hollow cavity 75 in the inside. The upper side harness receiving part 81 includes an upper side portion of this cavity 75, and the burr cutters 73. The lower side harness receiving part 83 includes a lower side portion of this cavity 75, and the burr cutters 73. The burr cutters 73 pinch an outer periphery of one bundle of the electric wire group 11 in both outside end portions of the cavity 75 along the extension direction of one bundle of the electric wire group 11. In the embodiment, in the burr cutters 73, the surfaces pinching the electric wire group 11 are formed of flat surfaces.

The burr cutter 73 in the lower mold 71 has a recessed part 85 capable of receiving one bundle of the electric wire group 11, and the depth from the lower mold division surface 79 is set in substantially the same as a diameter of the electric wire 19. On the other hand, the burr cutter 73 in the upper mold 69 is formed in a flat plate shape on the same surface as the upper mold division surface 77.

In addition, the burr cutters 73 in the lower mold 71 and the upper mold 69 may be formed of the same recessed part 85. In this case, in the recessed parts 85 constructing the burr cutters 73 of the lower mold 71 and the upper mold 69, each of the depths from the lower mold division surface 79 and the upper mold division surface 77 is set in substantially the same as a radius of the electric wire 19.

In the molding tool 51, the upper mold 69 and the lower mold 71 are clamped with one bundle of the electric wire group 11 received inside the recessed parts of the burr cutters 73 in the lower mold 71. In the molding tool 51 in which only the lower mold 71 is provided with the recessed parts 85, it becomes easy to arrange the electric wire group 11 in the lower side harness receiving part 83, and a bite of the electric wire at the time of clamping becomes resistant to occurring.

The plural lightening molding parts 87 are projected in the cavities 75 of the lower mold 71 and the upper mold 69. The lightening molding parts 87 enter a molten resin with which the cavities 75 are filled and thereby, the lightening parts 17 of the damming part 13 are formed in recessed shapes. That is, an outer shape of the lightening molding part 87 matches with an inner shape of the lightening part 17.

Next, action of the above configuration will be described.

In the waterproof structure of the wire harness according to the embodiment, the damming part 13 set in the electric wire group insertion part 27 with the divided structure formed on the upper and lower cases 33, 35 prevents water from entering a gap between the damming part 13 and the through hole 29 of the electric wire group insertion part 27 by the outer periphery shape part 21 of the parts of the vicinities of a pair of edge parts 43 formed in the trapezoidal shape in cross sections. In the damming part 13, the outer periphery shape part 21 of a different portion is formed with the lightening part 17 to decrease the volume of the thick-walled part and thereby, molding defects such as sinks or voids in the case of molding the electric wire group 11 become resistant to occurring.

Also, in the waterproof structure of the wire harness of the embodiment, a different portion in the outer periphery shape part 21 of the damming part 13 is also formed with a portion having a trapezoidal shape in cross section and thereby, a gap between the damming part 13 and the through hole 29 can be sealed watertightly in multiple steps in a passage direction of water. Accordingly, the damming part 13 can further prevent the water from entering the gap between the damming part 13 and the through hole 29 of the electric wire group insertion part 27.

Thus, the waterproof structure of the wire harness according to the embodiment includes the lightening part 17 in the thick-walled part of the outer periphery shape part 21 in the damming part 13 and thereby, a water flow passage through which the inside and the outside of the water stop box 31 communicate can be prevented from being formed. Accordingly, in the electric wire group insertion part 27, the whole annular periphery of an outer surface in the outer periphery shape part 21 of the damming part 13 surely makes close contact with the water stop material 15 stuck on the inner peripheral surface of the through hole 29. As a result, the waterproof structure of the wire harness can more surely prevent the water from entering in the electric wire group insertion part 27.

Also, in the waterproof structure of the wire harness of the embodiment, the length Ls of the water stop material 15 along the axial direction of the through hole 29 is set longer than the length Lg of the outer periphery shape part 21 along the extension direction of the electric wire group 11 and thereby, a pair of edge parts 43 of the outer periphery shape part 21 is not separated from the water stop material 15 even when a position of the damming part 13 deviates from the through hole 29 of the electric wire group insertion part 27. Accordingly, the damming part 13 can stably prevent the water from entering the gap between the damming part 13 and the through hole 29.

In addition, in the embodiment described above, the case of molding the damming part with the electric wire groups 11 of two steps is described, but the invention may be configured to mold the damming part with the electric wire groups 11 of three or more steps. Accordingly, the wire harness can simultaneously make the many electric wire groups 11 waterproof.

Consequently, the waterproof structure of the wire harness according to the embodiment can improve a waterproof effect while using the damming part 13 with the trapezoidal shape in cross section.

Here, the features of the embodiment of the waterproof structure of the wire harness according to the invention described above will be briefly summarized and listed as the following [1] to [3].

[1] A waterproof structure of a wire harness comprising:
at least one bundle of an electric wire group (11) in which a plurality of electric wires (19) are linearly arranged;
a damming part (13) made of a hard resin material, the damming part which surrounds a part of the electric wire group in an extension direction of the electric wire group and which includes an outer periphery shape part (21) according to a shape of a trapezoidal through hole (29) in an electric wire group insertion part (27) with a divided structure; and
a water stop material (15) which prevents water from entering a gap between the electric wire group insertion part and the outer periphery shape part and which is formed on an inner peripheral surface of the through hole,
wherein a pair of first portions (edge part vicinity regions 45) located in vicinities of a pair of opposing edge parts (43) in the extension direction of the electric wire group in the outer periphery shape part respectively have trapezoidal shapes in cross sections, and
wherein a second portion has a lightening part (17).

[2] The waterproof structure of the wire harness according to the above-described [1],
wherein the second portion (a part 47 between the lightening parts) in the outer periphery shape part further has a portion including a trapezoidal shape in a cross section.

[3] The waterproof structure of the wire harness according to the above-described [1] or [2],
wherein a length (Ls) of the water stop material in an axial direction of the through hole is longer than a length (Lg) of the outer periphery shape part in the extension direction of the electric wire group.

In addition, the invention is not limited to the embodiment described above, and modifications, improvements, etc. can be made properly. Moreover, as long as the invention can be achieved, for example, materials, shapes, dimensions, arrangement places of each component, and the number of components in the embodiment described above are freely selected and are not limited.

DESCRIPTION OF REFERENCE NUMERALS AND SIGNS

11 ... ELECTRIC WIRE GROUP
13 ... DAMMING PART
15 ... WATER STOP MATERIAL
17 ... LIGHTENING PART
19 ... ELECTRIC WIRE
21 ... OUTER PERIPHERY SHAPE PART
27 ... ELECTRIC WIRE GROUP INSERTION PART
29 ... THROUGH HOLE
43 ... EDGE PART
100 ... WIRE HARNESS

What is claimed is:

1. A waterproof structure of a wire harness comprising:
at least one bundle of an electric wire group in which a plurality of electric wires are linearly arranged;
an electric wire group insertion part including a through hole, the through hole being trapezoid shaped;
a damming part made of a hard resin material, the damming part surrounding a part of the electric wire group in an extension direction of the electric wire group and including an outer periphery shape part, the outer periphery shape part being shaped so as to correspond to the shape of the through hole in the electric wire group insertion part, the outer periphery shape part being housed within the through hole; and
a water stop material which prevents water from entering a gap between the electric wire group insertion part and the outer periphery shape part and which is formed on an inner peripheral surface of the through hole,
wherein a pair of first portions in the outer periphery shape part located in vicinities of a pair of opposing edge parts in the extension direction of the electric wire group respectively have trapezoidal shapes in cross sections perpendicular to the extension direction,
wherein a second portion in the outer periphery shape part other than the first portions has a lightening part, and
wherein a length of the water stop material in an axial direction of the through hole is longer than a length of the outer periphery shape part in the extension direction of the electric wire group.

2. The waterproof structure of the wire harness according to claim 1,
wherein the second portion in the outer periphery shape part further has a portion including a trapezoidal shape in a cross section perpendicular to the extension direction.

3. The waterproof structure of the wire harness according to claim 1,
wherein the electric wire group insertion part includes a divided structure.

* * * * *